United States Patent
Van Roojen

[11] 3,758,175
[45] Sept. 11, 1973

[54] MEMBRANE TYPE FLUID FLOW REGULATOR FOR A HYDROSTATIC BEARING

[75] Inventor: Jan Van Roojen, Rockford, Ill.

[73] Assignee: The Ingersoll Milling Machine Company, Rockford, Ill.

[22] Filed: Feb. 28, 1972

[21] Appl. No.: 230,004

[52] U.S. Cl............................ 308/5, 308/9, 137/503
[51] Int. Cl. ............................................. F16c 17/00
[58] Field of Search............................ 308/122, 5, 9; 137/508, 503

[56] References Cited
UNITED STATES PATENTS

| | | | |
|---|---|---|---|
| 1,997,404 | 4/1935 | Hamilton | 137/503 |
| 3,251,633 | 5/1966 | Mohsin | 308/5 R |
| 2,219,408 | 10/1940 | Benz | 137/508 |
| 2,086,698 | 7/1937 | Carroll | 137/508 |
| 3,308,848 | 4/1967 | Johnson | 308/9 |
| 3,260,162 | 7/1966 | Atherton | 308/5 R |
| 3,442,560 | 5/1969 | DeGast | 308/5 R |
| 2,884,282 | 4/1959 | Sixsmith | 308/9 |

Primary Examiner—Charles J. Myhre
Assistant Examiner—R. H. Lazarus
Attorney—Wolfe, Hubbard, Leydig, Voit & Osann

[57] ABSTRACT

A membrane type controller for regulating the flow of pressure fluid to the pad of a single hydrostatic bearing includes means for hydraulically applying a snubbing force to the back side of the membrane to prevent objectionable vibration thereof, means for precluding complete closure of the flow restricting gap during initial build-up of the supply pressure, and means for adjusting the initial width of the gap preparatory to service use of the controller.

6 Claims, 3 Drawing Figures

PATENTED SEP 11 1973 3,758,175

MEMBRANE TYPE FLUID FLOW REGULATOR FOR A HYDROSTATIC BEARING

BACKGROUND OF THE INVENTION

This invention relates to a controller of the type shown in U.S. Pat. No. 3,442,560 in which the fluid from a pressure source flows to a hydrostatic bearing pad by first passing radially in all directions through a thin gap having one rigid wall and an axially flexible wall defined by a diaphragm or membrane which is flexed back and forth and the width of the gap thereby varied in response to pressure changes on the membrane caused by the variations in the load on the bearing. The invention has more particular reference to such a flow regulator in which the rigid wall is formed on a plate mounted on and adjustable axially from the exterior of the membrane housing to establish the initial width of the gap and thus facilitate manufacture of the gap forming parts and the establishment of a gap of the desired precise and critical width preparatory to use in service.

SUMMARY OF THE INVENTION

The primary objective of the present invention is to adapt a device of the above character for regulating the fluid flow to a single hydrostatic bearing pad while insuring against objectionable vibration of the membrane in service use. This objective is achieved by providing, on the side of the membrane opposite the flow restricting gap, a hydraulic snubber charged from the same pressure supply as the flow restrictor.

The invention also resides in the novel manner of supplying pressure fluid to the snubber and the flow restricting gap under all conditions of service operation.

A further objective is to provide a novelly arranged stop which acts during building up to the pressure supply to preclude closure of the flow restricting gap.

DESCRIPTION OF THE PREFERRED EMBODIMENT

Figure 1:
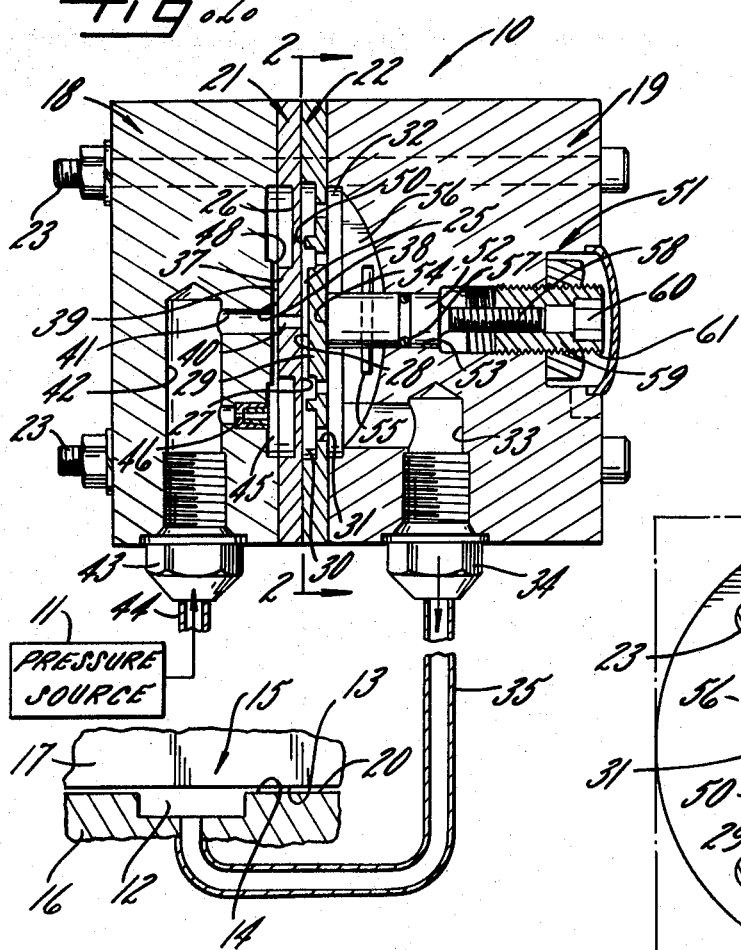
FIG. 1 is a section taken along the line 1—1 of FIG. 2 showing a controller embodying the present invention for regulating the flow of pressure fluid to the pad of a single hydrostatic bearing.
Figure 2:
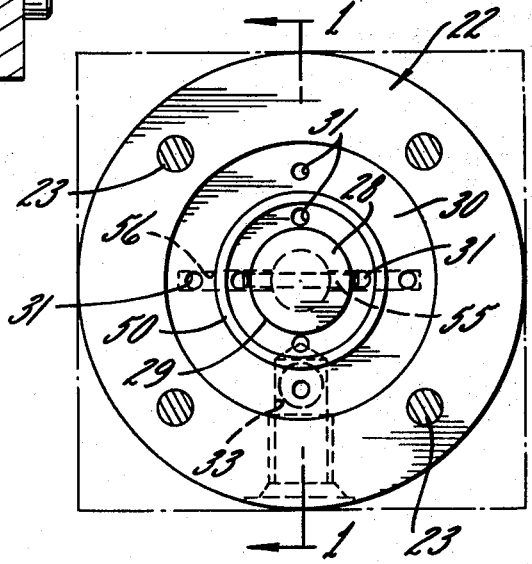
FIG. 2 is a section taken along the line 2—2 of FIG. 1.

For purposes of illustration, the invention is shown incorporated in a device 10 for controlling the continuous flow of fluid from a suitable pressure source 11, usually about 500 psi, to the recess or so-called pad 12 set in the surface 14 of a support 16 to form a hydrostatic bearing 15 providing a rigid and frictionless mounting for a member 17 such as the heavy work table of a machine tool during sliding thereof back and forth along the support. The pad may be of any desired shape and the opposed sill surfaces 13 and 14 surrounding the same are spaced apart, usually from 0.001 to 0.005 of an inch depending on the size of the pad and the load to be carried. The sill clearance 20 allows a continuous outflow of the pressurized fluid in all directions away from the pad.

The device 10 includes a housing formed by end blocks 18 and 19 separated by a partition plate 21 and a plate 22, all four of which have flat peripheral surfaces rigidly clamped together by bolts 23 extending through alined holes angularly spaced around the four parts. The partition 21 constitutes a diaphragm or membrane which defines the movable wall of a thin gap 25 through which pressure fluid from the source 11 flows edgewise and is delivered to the pad 12 at a rate determined by the prevailing gap width. Load changes on the bearing produce pressure changes in the controller causing axial flexing of the membrane and the corresponding changes in the rate of restricted flow of fluid to the pad in a manner later described.

Figure 3:
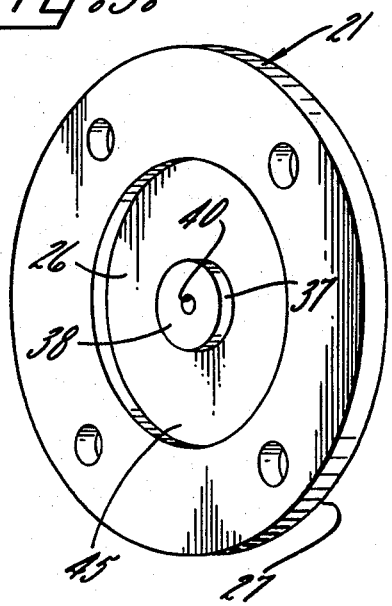
FIG. 3 is a perspective view of the membrane used in the controller.

To these ends, the membrane shown in FIG. 3 is made of resilient material such as steel and in this instance is formed intermediate its peripheries with an annular portion 26 sufficiently thin, for example .120 of an inch, to impart the axial flexibility required for proper response to the pressure changes involved in service use. The central area of the surface 27 of the partition cooperates with an opposed parallel surface 28 on an axially projecting button 29 at the center of the inner wall of the plate 22 to form the gap 25 which is usually about 0.008 of an inch wide and of uniform thickness throughout its area. The circular shape of the gap is determined by the outer periphery of the button 29 which defines the inner wall of an annular cavity 30 communicating through holes 31 in the plate 22 with an annular groove 32 in the inner end of the housing end block 19. Pressure fluid from this groove is conducted to the pad 12 through a passage 33, a fitting 34 and a pipe 35.

The thin portion 26 of the membrane is disposed between the thick outer periphery of the partition 21 and a circular central button 37 projecting axially from the opposite side of the membrane from the gap 25. The end 38 of this button is separated from the opposed inner end 48 of the housing block 18 by a narrow gap 39 which is supplied from the pressure source and allows for axial flexing of the membrane with a snubbing action as will be explained presently. In this instance, pressure fluid from the source 11 is conducted to the flow restricting gap 25 through the gap 39 and a hole 40 through the center of the membrane. On the opposite side, the gap 39 communicates through a hole 41 in the inner end of the housing block 18 with a passage 42 extending to the pressure source through a fitting 43 and a pipe 44.

Provision is made for backing the membrane on the side thereof opposite the gap 25 so that the forces exerted on opposite sides of the membrane will equalize when the bearing 15 is under normal load and the width of the gap 25 is such as to maintain the desired sill clearance 20. For this purpose, the gap 39 communicates around its outer periphery with an annular groove 45 thus exposing the back side of the thin portion 26 of the membrane to the supply pressure. Such pressure supply is insured by a restricted flow passage 46 between the groove 45 and the pressure supply inlet 42.

Assuming that the bearing 15 is under normal load and the forces exerted on opposite sides of the membrane are balanced, the fluid flow through the gap 25 will produce a pad pressure sufficient to maintain the desired sill clearance 20. Now, if the bearing load increases thus decreasing the sill clearance, the pressure increase reflected back to the groove 32 will flex the membrane to the left thus increasing the width of the gap 25 so as to allow an increase in flow to the pad with an accompanying increase in pressure enough to balance the increased load and reestablish the desired sill clearance.

The action is reversed in response to a decrease in the bearing load which is accompanied by widening of the sill clearance and a corresponding decrease in the force on the gap side of the membrane. Under the constant pressure on the back of the membrane, the latter is flexed to reduce the width of the gap 25 until the pad pressure has been reduced enough to balance the new load.

To prevent vibration of the membrane that would interfere with the accuracy of the controller in regulating the fluid flow to the bearing pad, the present invention provides for increasing the effectiveness of the hydraulic backing of the membrane in snubbing the axial movements of the membrane. It is for this purpose that the end 38 of the membrane button 37 is made large enough in area and disposed close to the opposing wall 48 so as to impart to the thin intervening gap 39 a substantial resistance to the lateral flow of fluid edgewise into and out of the gap as required for axial flexing of the membrane incident to bearing load changes as above described. Such resistance to opening and closing of the gap 39 results in a hydraulic snubbing action which has been found very effective in preventing objectionable vibration of the membrane under the changing conditions of service use. It has been found that a gap width on the order of 0.001 of an inch is desirable as compared with the greater width of 0.008 of the gap 25.

In another of its aspects, the invention provides means for preventing complete closing of the gap 25 and consequent disabling of the controller under abnormal conditions such as during the initial build-up of the supply pressure. For this purpose, an annular rib 50 formed on the inner wall of the plate 22 projects toward the membrane and constitutes a stop engageable by the membrane to limit axial flexing of the latter to the right as viewed in FIG. 1 and to a position short of complete closure of the gap 25. Thus, a path for the flow of fluid all the way to the pad is maintained during the initial building up of the supply pressure to the full operating value.

In hydrostatic bearings, it is known that the fluid flow through the sill clearance 15 is a cube function of the film thickness or width of such clearance. It is important, therefore, in single bearings as above described that the width of the gap 25 be dimensioned precisely in accordance with the film thickness desired in order to allow for inherent variations in slideway geometry but thin enough to keep the flow within reasonable limits. With the multiple part housing required for forming this gap, it is difficult and extremely costly to form the parts defining the gap walls and produce a gap of the desired width. To overcome this difficulty, provision is made in accordance with another aspect of the invention for adjustment of the gap width after installation of the controller in the environment where it is to function in service use.

To the foregoing end, the plate 22 forming the outer wall 28 of the gap 25 is made thin enough to be bendable axially by an externally applied force and, after adjustment of the gap to the desired width, to remain in fixed position. While such axial bending of the plate may be effected by adjusters of various types, it is preferred to employ a differential screw arrangement 51 selectively and manually operable to advance the plunger 52 which is slidable in a bore 53 in the block 19 and bearing at its inner end 54 against the center of the adjusting plate 22. The rod is held against turning by a crosspin 55 thereon disposed in a slot 56 in the block 19, the rod being surrounded by a seal ring 57. On the outer end portion of the rod is a thread 58 mating with an internal thread on a sleeve 59 having an external thread 61 of coarser pitch threaded into the outer end of a bore in the block. The recessed head 60 of the sleeve is exposed for manual turning to effect, through the screw threads of slightly different pitch, advance of the rod at an extremely slow rate thus providing for a very fine axial adjustment of the gap wall 28 and the width of the gap 25.

In the manufacture of the improved flow controller, the surfaces of the blocks 18 and 19, the partition 21, and the plate 22 are machined with reasonable accuracy so as to impart to the gap 25 when the parts are assembled a width somewhat greater than that required for producing a flow rate that will provide the desired film thickness in the bearing sill. Then, after assembly of the controller in the machine which it is to serve and connection hydraulically as above described, the plunger 52 is, by adjustment of the differential screw 51, advanced into abutment with the center of the plate 22 and the advance continued until the supported member 17 is raised enough to provide the desired sill clearance for the bearing 15.

I claim:

1. The combination of a hydrostatic bearing and a controller for regulating the rate of continuous flow of pressure fluid to the pad of the hydrostatic bearing and through the sill clearance thereof, said controller including a rigid housing having an inlet communicating with a source of fluid under pressure and an outlet leading to said pad, an axially flexible membrane made of a single piece of resiliently yieldable material, said membrane constituting a partition dividing said housing internally between said inlet and outlet and permitting the flow of pressure fluid therebetween, a rigid wall opposing and axially spaced from the membrane and defining between the central areas of the two a restriction in the form of a thin gap through which fluid passing through said membrane flows in all radial directions through the gap and to said outlet whereby said membrane is responsive to pressure changes within the outlet to vary the width of said gap and therefore the rate of flow of fluid to the pad of said hydrostatic bearing with changes in the loading of said bearing, a cavity within the housing on the opposite side of said membrane and communicating with said pressure source whereby to provide a hydraulic backing for the membrane opposing pressure changes on the gap side thereof, and means for resisting the flow of fluid between said cavity and said pressure source and comprising a thin gap formed between and defined by the back of said membrane and an area on the opposed end wall of said housing so as to produce a snubbing action preventing objectionable axial vibration of said membrane in service use.

2. The combination as defined in claim 1 in which pressure fluid from said source is supplied to the center of said first gap through a hole extending through said membrane so that the fluid flows through such gap outwardly in all radial directions from said hole and then to said pad.

3. The combination defined in claim 2 in which pressure fluid from said inlet is delivered to said hole transversely of and through said second gap.

4. The combination as defined in claim 2 including stop means acting during the initial build-up of pressure in said source to limit flexing of said membrane enough to close said first gap whereby to maintain a continuous path for the flow of fluid from said source to said pad.

5. The combination defined in claim 1 in which the thickness of said second gap is less than 0.005 of an inch.

6. The combination defined in claim 3 further including a passage extending from said inlet and into said second gap to deliver pressure fluid from said inlet to said hole, and a restricted passage extending from said inlet into said cavity at a point spaced from said second gap to insure the delivery of pressure fluid to said cavity when pressure fluid is first supplied to said inlet.

* * * * *